Patented Feb. 13, 1940

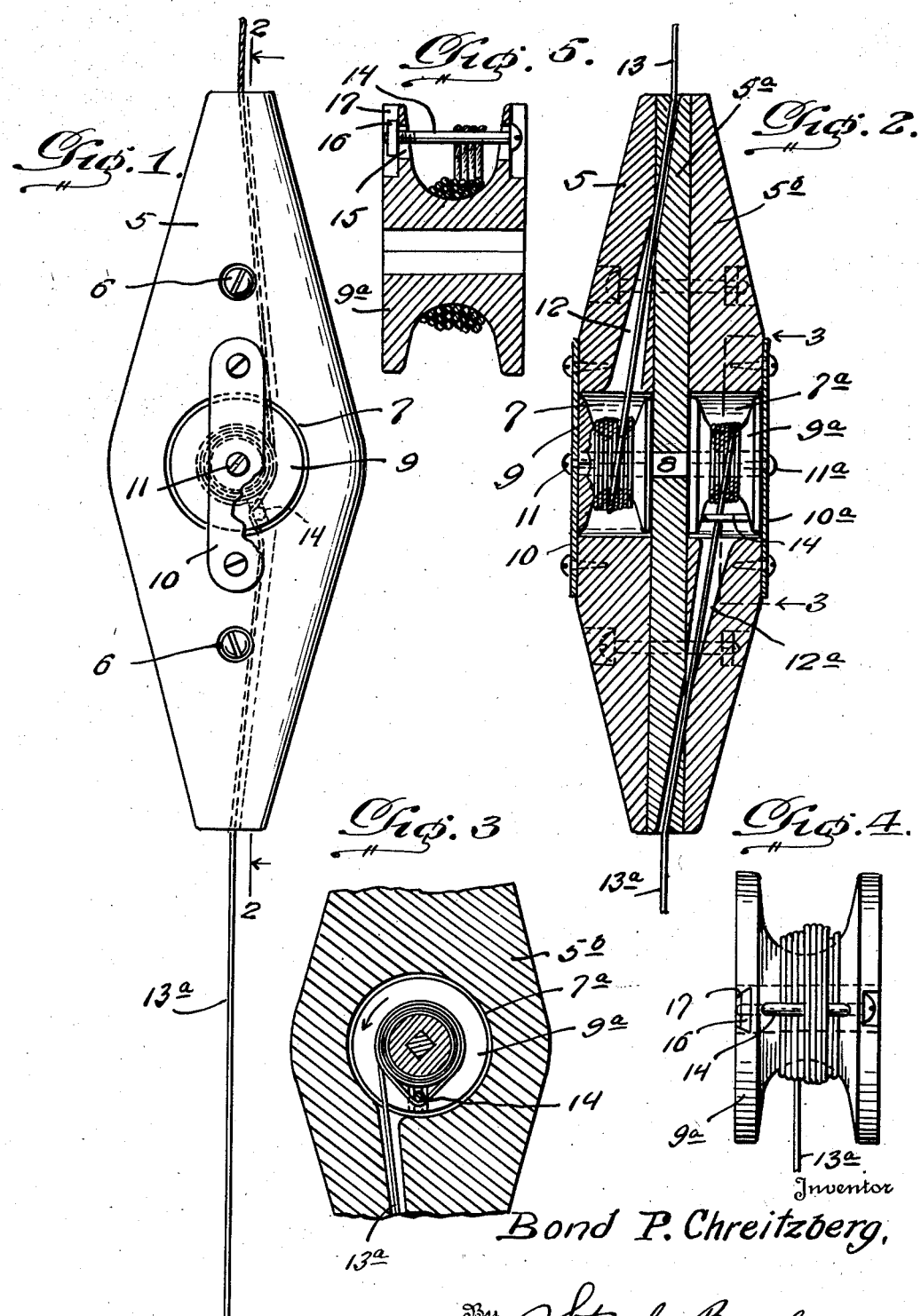

2,190,113

UNITED STATES PATENT OFFICE 2,190,113

FISHING FLOAT

Bond P. Chreitzberg, Georgetown, Tex.

Application October 6, 1938, Serial No. 233,659

7 Claims. (Cl. 43—51)

This invention relates to an improved fishing float or bob, and the primary object of the present invention is to provide a device of this kind which will automatically allow the sinker to lower a predetermined distance below the surface of the water.

A more particular object of the present invention is to provide a float or bob of the above kind having simple and efficient means for regulating the amount of line which may unwind from a spool of the float after the latter strikes the water, whereby the distance to which the sinker may lower below the surface of the water may be conveniently regulated.

A still further object of the present invention is to provide a float of the above kind which is simple in construction, durable, and efficient in operation.

Other objects and features of the present invention will become apparent from the following description when considered in connection with the accompanying drawing.

In the drawing:

Figure 1 is a side elevational view, partly broken away, of a fishing float constructed in accordance with the present invention.

Figure 2 is a longitudinal section on line 2—2 of Figure 1.

Figure 3 is a fragmentary section on line 3—3 of Figure 2.

Figure 4 is an elevational view of the spool forming part of the device of Figures 1 and 2 to which is attached the line adapted to carry the sinker and hooks; and Figure 5 is a central transverse sectional view of the spool shown in Figure 4.

Referring in detail to the drawing, the fishing float has been illustrated as an elongated body of wood or other buoyant material tapered smaller toward its ends and preferably composed of three longitudinal sections 5, 5a and 5b secured together in face to face relation by suitable means such as bolts 6 extending transversely therethrough at opposite sides of the longitudinal center of the float. The float is provided in opposite sides of its intermediate portion with circular recesses 7 and 7a consisting of circular openings in the outer of side sections 5 and 5b, the recesses being separated by an intervening wall provided by the central or intermediate section 5a. Journaled intermediate its ends within the intervening wall portion of section 5a is a shaft 8, and secured upon the ends of this shaft within the respective recesses 7 and 7a are spools 9 and 9a which substantially fit said recesses although freely rotatable therein. The shaft 8 and spools 9 and 9a are held in place by means of elongated plates 10 and 10a arranged longitudinally of the float and secured on opposite sides thereof so as to extend across the recesses 7 and 7a at the outer sides of the spools 9 and 9a. In order to furnish additional support for the shaft 8, screws 11 and 11a are journaled in central openings of the plates 10 and 10a and threaded into the ends of shaft 8. As the plates 10 and 10a are relatively narrow, the spools are exposed at opposite sides thereof as will be clearly seen in Figure 1.

Extending from recess 7 to one end of the float is a passage 12 and extending from the recess 7a through the opposite end of the float is another similar passage 12a. The fishing line 13 extending from the reel of the fishing rod has an end attached to the spool 9 and extends through the passage 12 with a portion of the line wound upon the spool 9. A further line 13a extends through the passage 12a and is attached to and partially wound upon the spool 9a. The line 13a is adapted to have the usual sinker attached to its outer end and also carries the necessary hook or hooks for the bait.

It will be seen that when the line 13 is wound upon the fishing reel it will unwind from the spool 9 so as to turn the latter, shaft 8 and spool 9a, thereby causing the line 13a to be wound upon said spool 9a so as to bring the hook and sinker in close proximity to the end of the float through which the passage 12a opens. In this condition, casting is done and when the float strikes the water and slack is provided in the line 13, the weight of the sinker attached to line 13a will cause said line 13a to unwind from spool 9a, the slack in line 13 being simultaneously taken up due to winding thereof on the spool 9 which is simultaneously rotated in the proper direction through its connection with shaft 8 and spool 9a. In order to regulate the amount of line 13a which may unwind from the spool 9a and thereby regulate the distance at which the sinker may be lowered below the surface of the water, I provide suitable means associated with the spool 9a and consisting of a transverse bolt 14 extending through radially elongated slots 15 in the flanges of spool 9a and having a nut 16 threaded upon the end thereof and slidably fitted in a radial undercut groove 17 provided in the adjacent flange of said spool 9a as clearly shown in Figures 4 and 5. It will be seen that the amount of the line 13a allowed to unwind from the spool 9a will be regulated by the amount of such line which is wound in surrounding relation to the bolt or pin 14, the portion of the line wound on spool 9a inwardly of the bolt or pin 14 being incapable of unwinding. This may be varied by removal of the bolt or pin 14, and the latter is readily accessible for this purpose when the spool 9a is disposed so that the head of bolt or pin 14 is exposed at one side of the adjacent plate 10a. Due to the dovetail or undercut form of groove 17 and the corresponding shape of nut 16, the latter will be maintained within said groove 17 so that the bolt 14 may be readily engaged therewith again as soon as the desired adjustment has been effected. As the periphery of the flanges of spool 9a are close to the circular wall of recess 7a, the nut 16 may not fall out of the groove 17 when the bolt 14 is removed. The slots 15 permit radial adjustment of bolt 14 so that any desired amount of the line 13a may be wound upon the spool 9a inwardly of said bolt 14. The bolt 14 is shown in an outward position in Figure 5 simply for sake of clearness, the same being, in actual practice, disposed against the windings inwardly thereof. If desired, the bolt 14 may be tightened by threading the same into nut 16 so as to maintain its position of radial adjustment relative to spool 9a.

It will be seen that the construction is very simple, durable and compact. The passages 12 and 12a may be readily formed when the sections of the float are separate, and likewise with respect to the openings in the outer or side sections of the float which afford the recesses 7 and 7a when the sections of the float are assembled. The spools are removably fitted on squared or like end portions of shaft 8 so that they may be readily placed on or removed from such shaft, and it will be seen that the structure lends itself to convenient and expeditious assembly.

While I have shown and described a preferred embodiment of the invention, it will be apparent that the device is capable of modification and changes in details of construction such as fairly fall within the spirit and scope of the invention as claimed.

What I claim as new is:

1. A fishing float comprising an elongated body of buoyant material, a pair of spools journaled within said body and connected together so that rotation of one will cause rotation of the other, fishing lines wound upon the respective spools and extending outwardly through opposite ends of the body, said lines being wound upon said spools in opposite directions, and adjustable means for automatically limiting the amount of line which may unwind from one of said spools.

2. A fishing float comprising an elongated body of buoyant material, a pair of spools journaled within said body and connected together so that rotation of one will cause rotation of the other, fishing lines wound upon the respective spools and extending outwardly through opposite ends of the body, said lines being wound upon said spools in opposite directions, means for adjustably limiting the amount of line which may unwind from one of said spools, said last-named means comprising transverse radially elongated slots in the flanges of said spool and an undercut radial groove in the outer face of said flanges, a nut slidably fitted in said groove, and a bolt extending transversely through said slots and threaded into said nut.

3. A fishing float comprising an elongated buoyant body having recesses in opposite sides of and intermediate the ends of the same, said recesses being open at the outer sides thereof, said body further having passages extending outwardly from the recesses to opposite ends of the body, a shaft journaled in the body between said recesses and projecting into the latter, spools secured upon the ends of said shaft within the respective recesses and having fishing lines wound thereon in opposite directions, said lines extending outwardly through said passages, and bearing plates for the ends of the shaft removably secured to the sides of said body and extending across said recesses.

4. A fishing float comprising an elongated buoyant body having recesses in opposite sides of and intermediate the ends of the same, said body further having passages extending outwardly from the recesses to opposite ends of the body, a shaft journaled in the body between said recesses and projecting into the latter, spools secured upon the ends of said shaft within the respective recesses and having fishing lines wound thereon in opposite directions, said lines extending outwardly through said passages, and elongated plates secured on opposite sides of the body and extending across said recesses, and screws journaled in said plates and threaded into the ends of said shaft for supporting the latter.

5. A fishing float comprising an elongated buoyant body having recesses in opposite sides of and intermediate the ends of the same, said body further having passages extending outwardly from the recesses to opposite ends of the body, a shaft journaled in the body between said recesses and projecting into the latter, spools secured upon the ends of said shaft within the respective recesses and having fishing lines wound thereon in opposite directions, said lines extending outwardly through said passages, said body comprising an intermediate and two outer side sections, the intermediate portion of the shaft being journaled in the intermediate section, and the outer side sections having transverse openings therein forming with the intermediate section recesses open at the sides of the body and receiving said spools.

6. A fishing float comprising an elongated body of buoyant material, a pair of spools journaled within said body and connected together so that rotation of one will cause rotation of the other, fishing lines wound upon the respective spools and extending outwardly through opposite ends of the body, said lines being wound upon said spools in opposite directions, and means for adjustably limiting the amount of line which may unwind from one of said spools, said last-named means comprising a removable pin extending transversely through the flanges of said spools.

7. A fishing float comprising an elongated body of buoyant material, a pair of spools journaled within said body and connected together so that rotation of one will cause rotation of the other, fishing lines wound upon the respective spools and extending outwardly through opposite ends of the body, said lines being wound upon said spools in opposite directions, and means for adjustably limiting the amount of line which may unwind from one of said spools, said last-named means comprising a removable pin extending transversely through the flanges of one of said spools and adjustable radially of the latter spool.

BOND P. CHREITZBERG.